United States Patent
Chen et al.

(10) Patent No.: US 6,470,491 B1
(45) Date of Patent: Oct. 22, 2002

(54) METHOD FOR MONITORING COMPUTER PROGRAMS ON WINDOW-BASED OPERATING PLATFORMS

(75) Inventors: Hsuan-Tung Chen; Kuang-Hsin Lin, both of Taipei (TW); Yung Chao, Tianjin (CN)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/280,898

(22) Filed: Mar. 29, 1999

(51) Int. Cl.[7] .................................................. G06F 9/44
(52) U.S. Cl. .......................................................... 717/127
(58) Field of Search ............................ 717/4, 1, 11, 10, 717/127–133; 709/331, 319, 205, 224

(56) References Cited

U.S. PATENT DOCUMENTS

| | | | | |
|---|---|---|---|---|
| 5,325,530 A | * | 6/1994 | Mohrmann | 395/700 |
| 5,636,376 A | * | 6/1997 | Chang | 717/4 |
| 5,835,765 A | * | 11/1998 | Matsumoto | 717/4 |
| 5,970,248 A | * | 10/1999 | Meier | 717/4 |
| 6,202,199 B1 | * | 3/2001 | Wygodny et al. | 717/4 |
| 6,233,729 B1 | * | 5/2001 | Campara et al. | 717/131 |
| 6,243,860 B1 | * | 6/2001 | Holland | 717/141 |
| 6,314,567 B1 | * | 11/2001 | Oberhauser et al. | 717/170 |

OTHER PUBLICATIONS

Ueki et al. Multi–Task Processor, Multi–Task Processing Method and Multi–Task Processing Display method. Sep. 1998. JP410240578A, Abstract.*

* cited by examiner

Primary Examiner—Gregory Morse
Assistant Examiner—Wei Zhen
(74) Attorney, Agent, or Firm—W. Wayne Liauh

(57) ABSTRACT

This invention relates to a method for monitoring an executed process, more particularly for monitoring and tracing the execution of an application program on a window-based operating platform. The method of the present invention is first to collect the information of all executed processes, and then to build up a history table of all processes for finding out the main process of the execution of the application program. Next, according to the processes' handles saved in the history table, the monitoring method is to extract all sub-processes of the main process and construct the relation of all processes of the execution of the application program. Finally, hierarchically trace and monitor all executed processes of the application program.

3 Claims, 4 Drawing Sheets

| types of processes | handle of processes | father handles of processes |
|---|---|---|
| system-level process A | 0001 | |
| system-level process B | 0002 | |
| system-level process C | 0003 | |
| process 1 | 0101 | |
| process 2 | 0102 | 0101 |
| setup.exe | 10001 | 10001 |
| copyfile.exe | 10002 | 10001 |
| change.exe | 10003 | 10001 |

FIG.5

METHOD FOR MONITORING COMPUTER PROGRAMS ON WINDOW-BASED OPERATING PLATFORMS

BACKGROUND OF THE INVENTION

This invention relates to a method for monitoring the process execution of a computer program, more particularly for monitoring the installing process of an application program on window-based platforms.

On a Microsoft window-based operating platform such as the Win95, 98 and NT, an application program has at least one process execution. The operating system will give every process a number called "handle" for identification. To monitor the executions of application programs is an important article. In the prior art, there exist two methods for monitoring the installing processes of application programs on window-based platforms. One is used to monitor the application programs that each their setup program has only one process, and the other one monitors those with more than one process in their setup program. As shown in FIG. 1, a monitoring system 11 is used to monitor the execution of a simple application program 12 whose setup program has just only one process, where both programs are executed on a Microsoft window-based operating system. In FIG. 2, another monitoring system 11a, executed on a Microsoft window-based operating system, monitors the execution of a complex application program 13 which possesses a first sub-process 131 and a second sub-process 132. In order to monitor the complex application program 13, the most important objective is to completely trace its execution process and all its sub-processes. Hence, it is basic to know the number of sub-processes of a monitored application program. If we want to monitor an application program without knowing the number of sub-processes and the relation of all processes, a more powerful monitoring system is really required.

SUMMARY OF THE INVENTION

The objective of the present invention is to provide a method for monitoring the executions of application programs on window-based operating platforms such as Microsoft Win95, 98 and NT.

To monitor the execution of an application program on an window-based operating platform, the method of the present invention is first to collect the information of all executed processes, and then to build up a history table of all processes for finding out the main process of the execution of the application program. Next, according to the processes' handles saved in the history table, the monitoring method is to extract all sub-processes of the main process and create the relation of all process execution of the application program. Finally, hierarchically trace and monitor all executed processes of the application program.

BRIEF DESCRIPTION OF THE DRAWINGS

Other objects, features, and advantages of the invention will become apparent from the following detailed description of the preferred but non-limiting embodiments. The description is made with reference to the accompanying drawings in which:

FIG. 5 shows an embodiment of a history table of the present invention.

DETAILED DESCRIPTION OF THE PREFERRED EMBODIMENT

Figure 1:
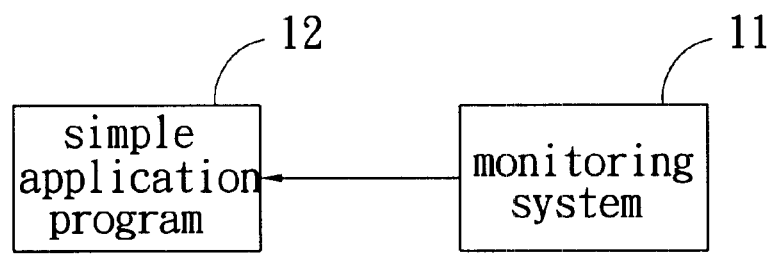
FIG. 1 illustrates the procedure of a monitoring method of the prior art.
Figure 2:
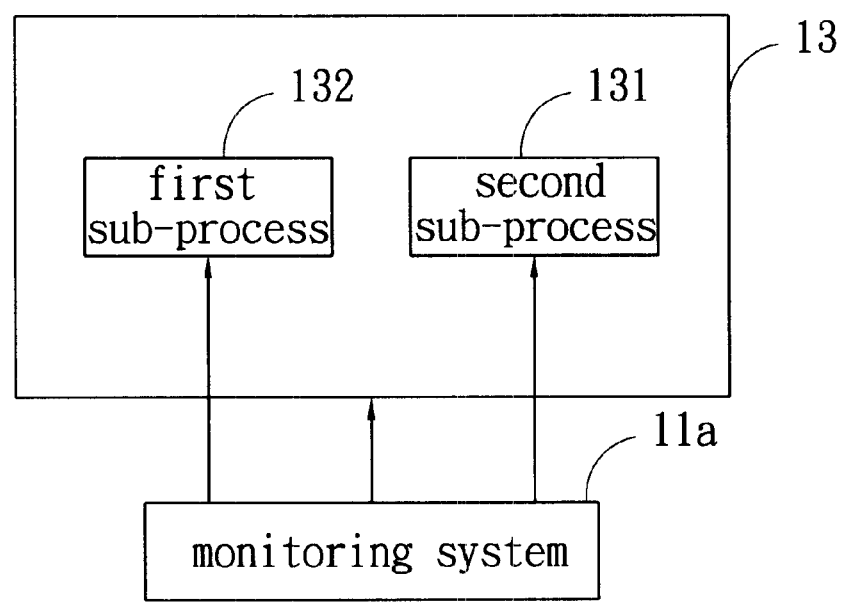
FIG. 2 illustrates the procedure of another monitoring method of the prior art.
Figure 3:
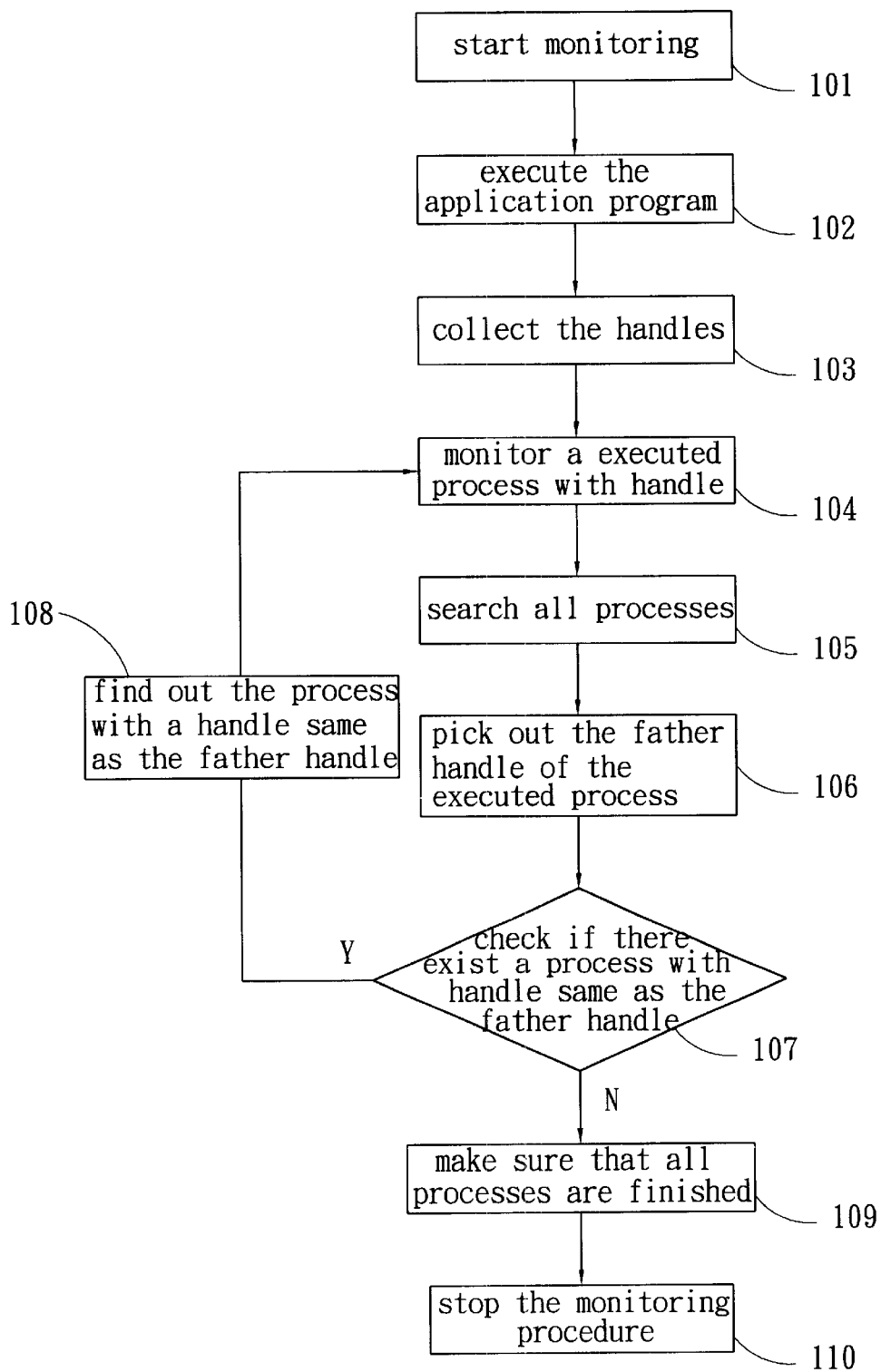
FIG. 3 is the operation flow chart of the monitoring method of the present invention.
Figure 4:
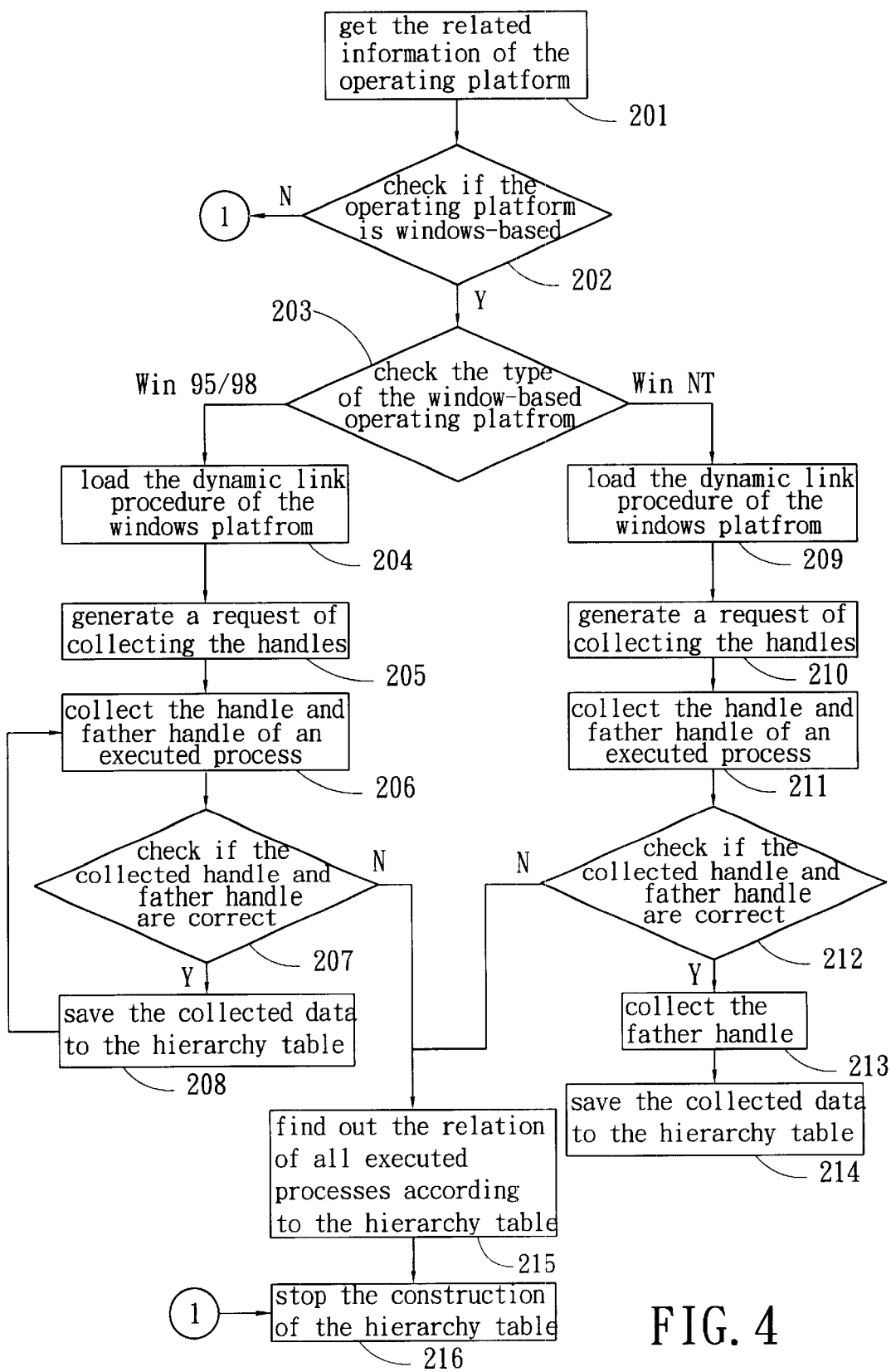
FIG. 4 is the flow chart of constructing a history table of the monitoring method according to the present invention.

Please refer to FIG. 3 which shows the operation flow chart of the monitoring system of the present invention. The monitoring method of the invention includes the following steps:

Step 101. Start the monitoring procedure;

Step 102. Execute the application program requiring monitor;

Step 103. Collect the handles of all execution processes of the monitored application program, and build up a history table;

Step 104. Monitor a executed process whose handle saved in the history table, which has three fields of a process-type field, a handle-number field and a father-handle-number field; FIG. 5 is an embodiment of the history table of the invention where the process-type field 21 records the types of all processes, the handle-number field 22 registers the handles of all processes, and the father-handle-number field 23 stores the father handles of all sub-processes; for example, in the history table shown in FIG. 5, the father handle of the process II is numbered "0101" which is the handle of the process I;

Step 105. Search all processes executed on the window-based operating platform;

Step 106. Pick out the father handle of the executed process;

Step 107. Check if there exist a process whose handle is same as the father handle of the executed process; if YES, go to the next step; otherwise, jump to the following step 109;

Step 108. Obtain the process whose handle is same as the father handle of the executed process; let it be a new executed process, and then jump to the step 104;

Step 109. Make sure that all processes are finished; and

Step 110. Stop the monitoring procedure. At the step 103, the steps of constructing a history table include:

Step 201. Obtain the related information of the operating platform;

Step 202. Check if the operating platform is window-based; if YES, go to the next step; otherwise, jump to the following step 216;

Step 203. Check if the window-based operating platform is the window 95, 98 or NT; if it is the window 95 or 98, go to the next step; if it is the window NT, jump to the following step 210;

Step 204. Load edynanic link procedure of the window 95 or 98 platform;

Step 205. Generate a request of collecting the handles of all executed processes to the operating system;

Step 206. Collect the handle and father handle of an executed process;

Step 207. Check if the collected handle and father handle are correct; if YES, go to the next step; otherwise, jump to the following step 215;

Step 208. Save the collected handle, father handle and the type of the executed process to a row of the history table, and then jump to the step 206;

Step 209. Load the dynamic link procedure of the window NT platform;

Step 210. Simulate the environment of a window-NT file by using a window function;

Step 211. Collect the handle of an executed process by using the above simulated environment;

Step 212. Check if the collected handle is correct; if YES, go to the next step; otherwise, jump to the following step 215;

Step 213. Collect the father handle of the executed process by using a window function;

Step 214. Save the collected handle, father handle and the type of the executed process to a row of the history table, and then jump to the step 211;

Step 215. Obtain the relation of all executed processes on the operating platform according to the information of the history table; and Step 216. Stop the construction of the history table.

Please refer to FIG. 5. Suppose that a monitoring system of the invention is started, and a setup procedure (Setup.exe) 133 with two sub-procedures are executed on a window-based operating platform, where the sub-procedures are a file-copy procedure (Copyfile.exe 134 and a file-edit procedure (Change.exe) 135. According to the monitoring method of the invention, a history table 20 is first generated (as shown in FIG. 5), and then serially monitor the executed processes according to the information of the history table 20. Here, assume the execution and monitor of the file-copy procedure (Copyfile.exe) 134 are finished. According the father handle (1001) of the file-copy procedure 134 and the handle (1001) of the setup procedure (Setup.exe) 133 recorded in the history table 20, it is known that the file-copy procedure 134 is a sub-process of the setup procedure 133. Similarly, the file-edit procedure (Change.exe) 135 is also a sub-process of the setup procedure 133. Since the file-edit procedure 135 is not yet executed, it is the next process to be executed and monitored. After the execution and monitor of the file-edit procedure 135 are finished, the setup procedure 133 becomes the next process to be executed and monitored by the monitoring system of the invention. Since all sub-processes (134 and 135) of the setup procedure 133 have been executed, the monitoring system is stopped after finishing the execution and monitor of the setup procedure 133. In addition, the monitoring system displays a message to tell users that the setup procedure is completely finished at the same time of ending the process of the monitoring system. The monitoring method of the invention is capable of monitoring an application program without knowing the number of its sub-processes and the relation of all processes.

It is noted that a method for monitoring computer programs on window-based operating platforms described above are the preferred embodiments of the present invention for the purposes of illustration only, and are not intended as a definition of the limits and scope of the invention disclosed. Any modifications and variations that may be apparent to a person skilled in the art are intended to be included within the scope of the present invention.

What is claimed is:

1. A method for monitoring the process execution of an object on a window-based operating platform, comprising:

obtaining the main process of said object being executed;

obtaining a sub-process which is executed on said window-based operating platform and belongs to said main process;

creating a history table for recording the information of all processes executed on said window-based operating platform; and displaying all executed processes of said monitored object in accordance with the contents of said history table;

wherein:

said history table include a process-type field, a handle-number field and a father-handle-number field, the types of said main process and said sub-process are recorded in said process-type field, said father-handle-number field contains the father handle of said sub-process, said main process has a handle recorded in said handle-number field, and said sub-process has a handle recorded in said handle-number field.

2. The method as claimed in claim 1 wherein said history table records the connection relationships between said main process and said sub-process, and the connection relationships between said sub-process and other sub-process.

3. A method for monitoring the execution of an application program which comprises a main process and at least one sub-process, said application program being executed on a platform that has a dynamic link procedure already loaded, and said method comprising the steps of:

(a) assigning a handle number to every process being executed on said platform;

(b) assigning a farther-handle number to a process if it is a sub-process of a main process, said farther-handle number of said process corresponding to the handle number of said main process;

(c) generating a history table, which contains a process name, a handle number field, and a farther-handle number field, by collecting said handle number and said farther-handle number, if any, for each of said processes being executed on said platform;

(d) displaying all processes being executed on said platform in accordance with said history table; and (e) after a first process being monitored is finished its execution, checking to see it contains a non-empty farther-handle number, if yes, stopping monitoring, if no, then searching said all said processes in said history table to find a second process whose handle-number is the same as the farther-handle number of said first process and beginning monitoring said second process.

* * * * *